(12) United States Patent
Zeng

(10) Patent No.: US 6,469,956 B1
(45) Date of Patent: Oct. 22, 2002

(54) ULTRASONIC DISTANCE DETECTION FOR VISUALLY IMPAIRED PEDESTRIANS

(76) Inventor: Xing Zeng, 4365 Kensington Ave., Montreal, Quebec (CA), H4B 2W4

( * ) Notice: Subject to any disclaimer, the term of this patent is extended or adjusted under 35 U.S.C. 154(b) by 0 days.

(21) Appl. No.: 09/535,700

(22) Filed: Mar. 27, 2000

Related U.S. Application Data

(60) Provisional application No. 60/482,682, filed on Mar. 29, 1999.

(51) Int. Cl.[7] .......................... G01S 15/88; G01S 15/08
(52) U.S. Cl. ......................... 367/116; 367/99; 367/909
(58) Field of Search .......................... 367/87, 95, 99, 367/104, 112, 116, 909, 910

(56) References Cited

U.S. PATENT DOCUMENTS

| | | |
|---|---|---|
| 2,500,638 A | 3/1950 | Krauth |
| 4,103,278 A | 7/1978 | Satake et al. |
| 4,280,204 A | 7/1981 | Elchinger |
| 4,371,945 A | 2/1983 | Karr et al. |
| 4,551,825 A * | 11/1985 | Biber .......................... 367/116 |
| 4,660,022 A | 4/1987 | Osaka |
| 4,680,740 A | 7/1987 | Treptow |
| 4,712,003 A | 12/1987 | Ban et al. |
| 4,761,770 A | 8/1988 | Kim et al. |
| 4,870,687 A | 9/1989 | DeLeon |
| 4,991,126 A | 2/1991 | Reiter |
| 5,032,836 A | 7/1991 | Ono et al. |
| 5,107,467 A * | 4/1992 | Jorgensen et al. .......... 367/116 |
| 5,144,294 A | 9/1992 | Alonzi et al. |
| 5,347,273 A | 9/1994 | Katiraie |
| 5,508,699 A | 4/1996 | Silverman |
| 5,687,136 A | 11/1997 | Borenstein |
| 5,724,313 A | 3/1998 | Burgess et al. |
| 5,982,286 A * | 11/1999 | Vanmoor ..................... 367/118 |

* cited by examiner

*Primary Examiner*—Ian J. Lobo
(74) *Attorney, Agent, or Firm*—James Anglehart; Ogilvy Renault

(57) ABSTRACT

Ultrasound is used to determine, by echo ranging, the distance of objects in front of a user for allowing a visually impaired pedestrian to walk safely. A double circuit allows two simultaneous measurements. Distances measured are converted into human paces or steps. Then each ear of the human receives measurement information. The user can calibrate the apparatus for his or her own stride.

18 Claims, 6 Drawing Sheets

| Message Number | Start Address Count | Hex Representation | Audio Message |
|---|---|---|---|
| 0 | 0 | 0x0 | "Too Close" |
| 1 | 16=1x16 | 0x10 | "One Step" |
| 2 | 32=2x16 | 0x20 | "Two Steps" |
| 3 | 48=3x16 | 0x30 | "Three Steps" |
| ... | ... | ... | ... |

Fig-6

ULTRASONIC DISTANCE DETECTION FOR VISUALLY IMPAIRED PEDESTRIANS

This application claims the benefit of U.S. Provisional Application No. 60/482,682 filed Mar. 29, 1999.

FIELD OF THE INVENTION

The present invention relates to obstacle detection devices to be used by visually impaired pedestrians. More particularly, the present invention relates to an ultrasonic-based obstacle detection device.

BACKGROUND OF THE INVENTION

The task facing visually impaired pedestrians is the task of independently starting from a point and ending at a destination. This seems simple. However, it appears to be extremely challenging once the factors affecting mobility are taken into account. If one were to close his eyes and tried to move just a few steps, it would not take long for him to realize that the visually impaired have no access to basic information such as spatial orientation, the nature of the obstacles, the presence of moving objects, or even the boundaries of the path or travel surface.

Travelling aids have long been developed in efforts to allow visually impaired pedestrians to travel and move about safely and comfortably. One of the first versions and the most widely used up to the present is the long cane. Since the 1960's, several types of electronic travel aids (ETA) have been developed to improve the mobility of visually impaired pedestrians. Some of these devices are now currently available. The Russell Pathfinder provides one such example. It first came into use in 1965 and employs an ultrasonic beam to detect objects. It provides a vibrating warning that is inversely proportional to the distance. The Nottingham Obstacle Detector, designed in 1973, is a hand-held device that provides an auditory readout of the distance between the visually impaired individual and the object with eight musical notes. Recent technical development permits the use of a human voice to communicate the distance between the visually impaired individual and the object by a voice message.

U.S. Pat. No. 4,870,687 to Deleon discloses an oral readout rangefinder. It orally announces the measured distance by using of a speech synthesiser. U.S. Pat. No. 5,508,699 to Silverman discloses a dual sensing identifier/locator device for the visually impaired. It composes of two parts. Transmitters attached to a variety of objects send out coded signals to indicate the names of the objects. A receiver attached to the user decodes the signal and produces audible output that includes the name of the object and the distance. U.S. Pat. No. 5,347,273 to Katiraie discloses an ultrasonic detection system. It is basically a collision sensing system used by both automobiles and the visually impaired. For the visually impaired application, transducers are mounted on a cane. It gives the exact distance of an obstacle from the visually impaired using the device by a voice message. U.S. Pat. No. 5,724,313 to Burgess et al discloses a guide device using pitches and tones to inform the user of the nature of the obstacle.

All of these devices, some of which have been innovative in their own way, have serious deficiencies. They have often lacked functionality and compactness necessary for one who will use the device while walking. The distance information provided has often at best been impractical and at worst incomprehensible to a visually impaired individual. They generally have lacked the ability to adapt to the needs and characteristics of the visually impaired individual who will use the device. Thus, what is needed is a compact, functional device that readily adapts to the needs and characteristics of a visually impaired individual. A device which provides in a readily comprehensible and intuitive form information on the distance between a visually impaired individual and an object that person is approaching.

SUMMARY OF THE INVENTION

It is an object of the present invention to provide an ETA method and apparatus for a visually impaired individual that is economical and easy to use so that a visually impaired individual can safely move about on his or her own.

It is an object of the present invention to provide an ETA obstacle detection device and method for guiding visually impaired pedestrians in a safe, comfortable and easy manner.

It is yet another object of the present invention to provide an ETA method and apparatus which provides information on distance to an object in an intuitive manner which makes it easy for the visually impaired individual to easily and quickly understand the distance units and what they actually represent in their own experience.

It is yet another object of the present invention to provide an ETA with a method and apparatus which provides distance information in units of step or stride of an individual.

It is yet another object of the present invention to provide a means for the user to calibrate the apparatus to their own personal preferences or characteristics.

It is yet another object of the present invention to provide an ETA apparatus which is provided in an easy to use, compact and unobtrusive package.

The present invention provides an ETA apparatus and system which uses ultrasonic sound as a ranging medium with a dual channel transducer driver system to determine by echo ranging the distance of objects in front of a user of the ETA apparatus. The apparatus converts the information obtained from the time difference between an ultrasonic transmission and its subsequent echo to determine distance and it communicates the measure of distance to the user in measurements of normal human strides. The information on distance is presented to the user by pre-recorded statements of the number of strides or steps to the object or obstacle detected.

In a further aspect of the present invention, a twin channel transducer allows it to discriminate between objects that are on the left or right side of the path of travel of the user and to determine which is closer.

In yet another aspect of the invention information on distances and location of objects is provided to the user by a dual channel sound system that discriminates between objects or obstacles on the left or right of the user. The system, in its preferred embodiment, has ear phones for each ear which transmit the information by the left or right or both audio channels depending on the position of an obstacle or obstacles by sending an audio signal that is louder to the side that the an object is closer on as well as an audio distance message.

In yet another aspect of the present invention it incorporates the ETA of the present invention within the frame of glasses for the visually impaired pedestrian. The electronics is in a miniaturized configuration.

In yet further aspect of the present invention it provides a method and apparatus for the user to calibrate the distance of the stride used to measure and inform the user of distance to an object to the users preferred stride or step characteristics.

BRIEF DESCRIPTION OF THE DRAWINGS

The invention will be better understood by an examination of the following description, together with the accompanying drawings, in which:

FIG. 6 is one arrangement and use of the memory address that make up a memory of the present invention.

DETAILED DESCRIPTION OF THE PREFERRED EMBODIMENT

Figure 1:
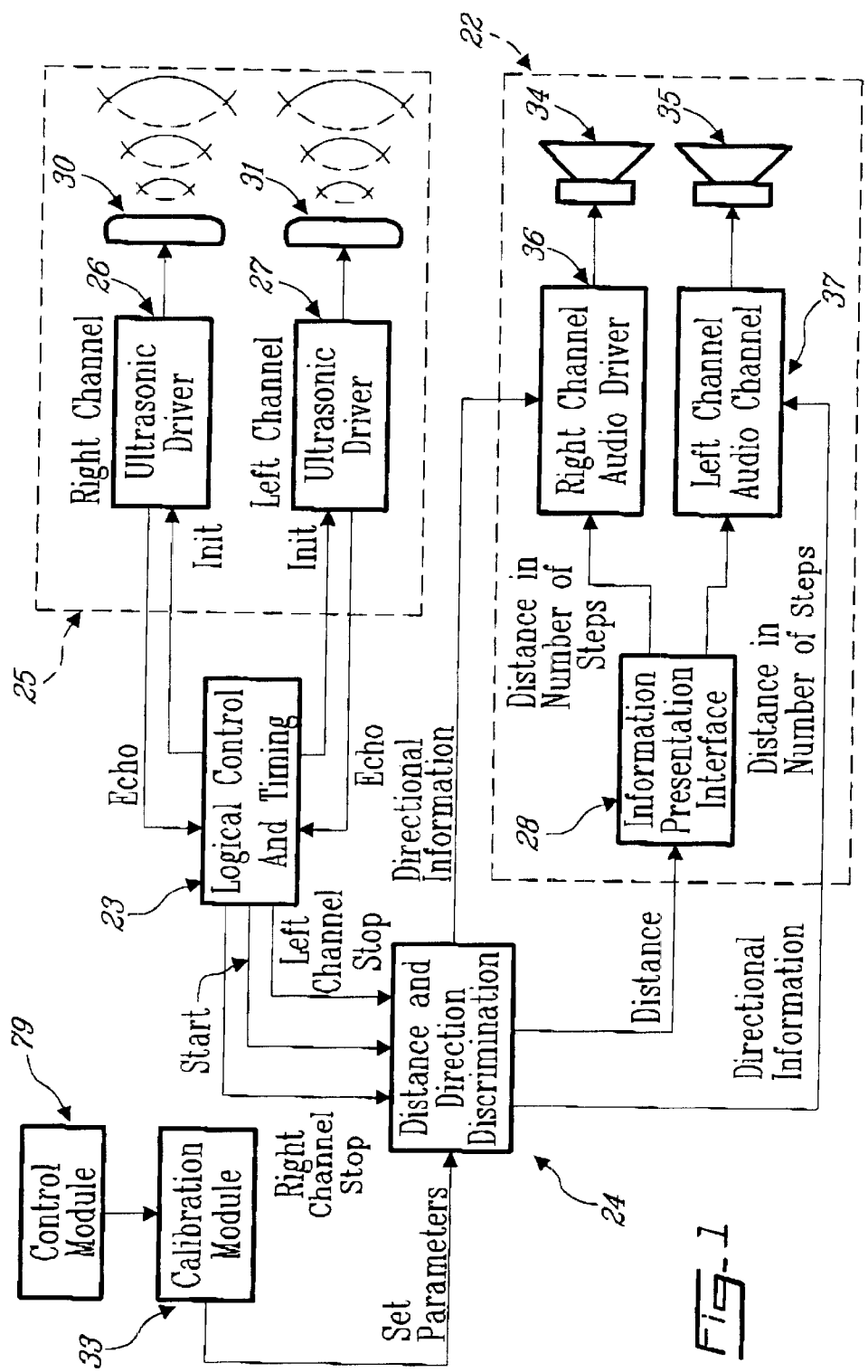
FIG. 1 is the block diagram of the major functional components of the present invention.

The Overall Apparatus.

The invention works on the well-known principle of range and direction finding with reflected ultrasonic sound waves in a fashion similar to the operation of radar and sonar. The ultrasonic travel aid of the present invention allows the measurement of distance between two points by emitting a short burst of high frequency sound waves and listening for an echo. When the echo is received, the time elapsed between the outgoing and reflected sound pulse is measured. Knowing the speed of the sound wave and the time taken to travel, the distance from the emission point of the ultrasound to the object can be calculated by the formula: $D=(S \times T)/2$, where D stands for half the total distance traveled, S for the speed of sound wave and T for the time elapsed. D, in the present invention being the distance from the point of generation of the ultrasound burst to the object which created the echo of the ultrasound burst received.

Ultrasound essentially means "high frequency sound." The frequency range of ultrasound is from twenty to five hundred thousand vibrations per second, too high for human beings to perceive. It was chosen as the transmission medium over other mediums, such as light or radio waves or lower frequency sound waves because of its unique characteristics. Sounds at higher frequencies are more directional and focused than lower frequency waves. Ultrasonic waves can also be focused much like a beam of light. Therefore, an obstacle will more strongly reflect a beam of ultrasound waves than lower frequency sound waves. Because of its relatively slow speed of propagation, it is easy to detect. Furthermore, the ultrasonic sensor, a device that transmits ultrasonic pulses and receives the reflected echoes, can withstand extremely harsh environments, making it more suitable for outdoor applications.

Since the visually impaired are unable to read visual display, audio is the most efficient way to communicate information to the user. Musical notes have long been used to represent distance. Many ETAs also use vibrations where the intensity of the vibrations warns the user of the range between him and the obstacle. However, these methods leave the visually impaired user to translate notes or vibrations into an understanding of the distance. This is ineffective and often leads to confusion or worse for the visually impaired user.

One of the objectives of the present invention, the ultrasonic travel aid, is to improve the presentation of information, a common shortcoming of ETAs up to now.

The new method uses state of the art technology to present distance in human voice. If the distance is given in either meters, feet, inches etc. most person especially the visually impaired still have difficulty in conceptually understanding units of measure expressed in this form. Therefore, an artificial intelligence is added by presenting the units of distance in steps or strides corresponding to the length of the user stride. The length of one's own step or stride is a unit that everyone can comprehend without difficulty. This is particularly true of the visually impaired, many of which have had such impairment from birth and thus have a greater conceptual difficulty in translating distance measurements into something understandable.

As depicted in FIG. 1, a block diagram of the major functional parts the present invention, the ultrasonic travel aid consists of four major functional parts: a Logic Control module 23, an Ultrasonic Generation module 25, a Distance and Direction Discrimination module 24, and an Information Presentation module 22. The invention has a fifth component a Calibration module 33 which, as will be explained below in detail, is used to adjust the unit to the personnel stride or step characteristics of the individual user.

The Ultrasonic Generation module 25 has two subcomponents composed of two parts each. A left ultrasonic driver 27 which drives a left ultrasonic transducer 31 and a right ultrasonic driver 26 which drives a right ultrasonic transducer 30. When commanded, the right 26 and left 27 ultrasonic drivers produce in their respective ultrasonic transducers 30 and 31 burst of ultrasonic sound. Likewise, when the transducers 30 and/or 31 receive a return echo, they communicate receipt of this echo to their respective ultrasonic driver. Having a separate circuit and transducer for the right and left side allows the system to determine which side the object being approached is on or if it is across the entire path of the user.

The ultrasonic drivers 26 and 27 are controlled by and communicate with the Logic Control module 23, which sends the signal that instructs each ultrasonic driver 26 and 27 to emit periodic bursts of ultrasonic sound through their respective transducers. In turn, when the ultrasonic transducer 30 or 31 receives an echo, they communicate this event to the Logic Control module 23. If, as will be discussed in detail below, the echo is received within the requisite period of time, the Logic Control module will generate a STOP LEFT or STOP RIGHT signal to their respective ultrasonic driver 26 or 27.

Figure 2:
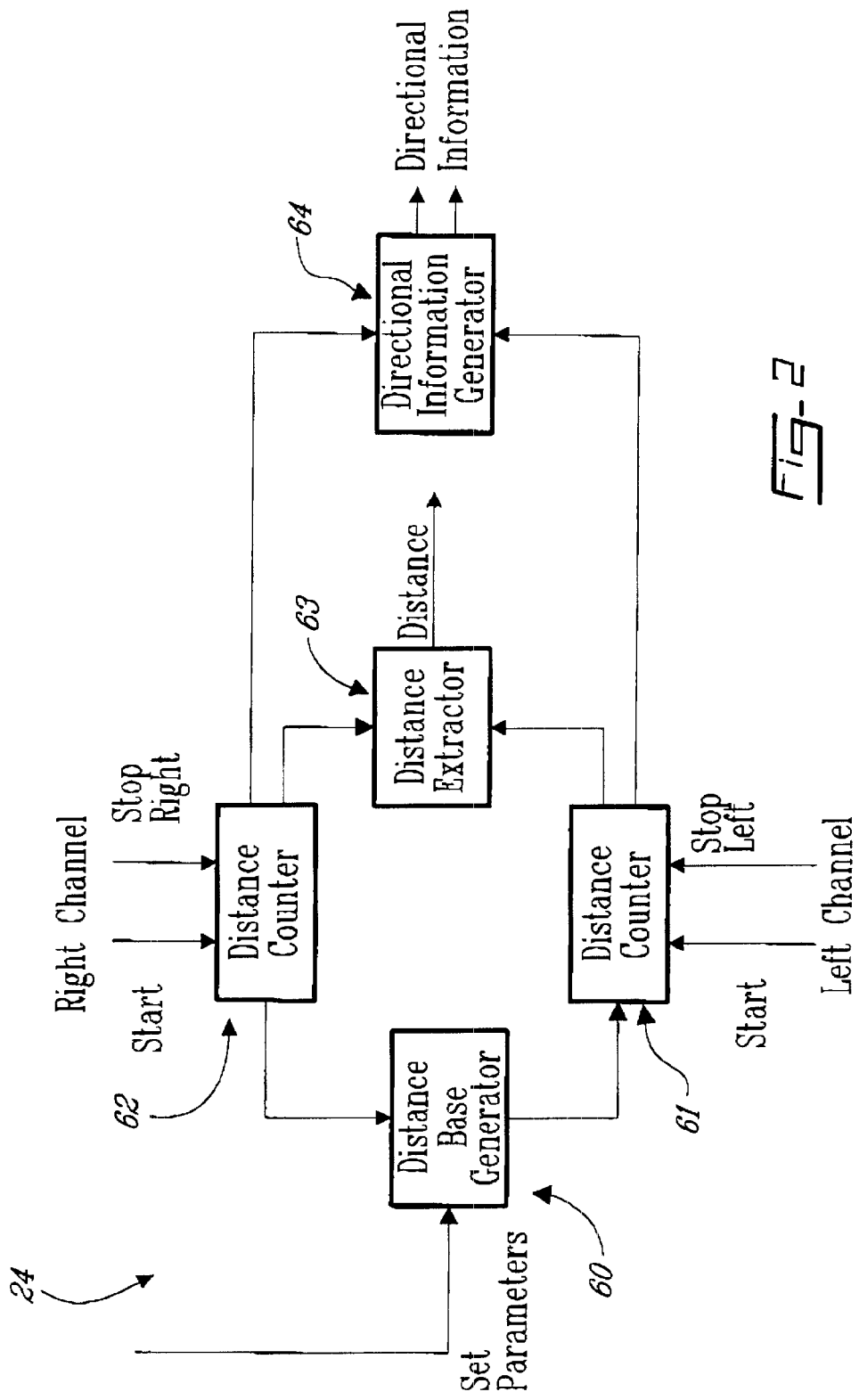
FIG. 2 shows the detail of the core functional component of the present invention.

The Distance and Direction Discrimination module 24, depicted in detail in FIG. 2, consists of a Distance-Base Generator 60, a left channel Distance Counter 61 for the left ultrasonic driver 26, and a right channel Distance Counter 62 for the right ultrasonic driver 27, a Distance Extractor 63, and a Directional Information Generator 64, etc. subcomponents. This module is also controlled by the Logic Control module 23. Upon receiving the START signal, the Distance-Base Generator 60 starts to generate pulses. In the meantime, the left and right channel Distance Counter 61 and 62 start to count distance-base pulses. Upon receiving a STOP LEFT or STOP RIGHT signal, the corresponding counter will stop counting. The counted number of pulses is proportional to the distance between the obstacle and the sensor.

The Distance Extractor 63 determines which obstacles detected by the dual ultrasonic driver is closer to the user. To do this, it compares the dual distance counter 61 and 62 outputs, taking the smaller one, representing the obstacle closer to the user. In the preferred embodiment of the present invention outputs from the dual distance counters 61 and 62

(the dual distance counters in the preferred embodiment will most likely be clocks or similar appropriate device) will be normalized by a preset value that represents the largest distance the sensor can measure. The normalized distance being the maximum distance that the unit is set to detect objects. Standard transducers that would function with the present invention have a range of about 20 to 30 meters. However, the normalized distance in the preferred embodiment is about 10 meters a distance equivalent to roughly 30 to 33 steps or strides by the average individual.

Referring back to FIG. 1 the Information Presentation module 22 is made up of an Information Presentation Interface 28 that drives a right audio channel driver 36 and audio output 34 and a left audio channel driver 37 and audio output 35. The two separate audio channels, one for each ear, plus the corresponding left and right ultrasonic transducers give the apparatus and system of the present invention the ability to distinguish which side an object sits on or if it sits across the entire path the individual user.

Figure 3:
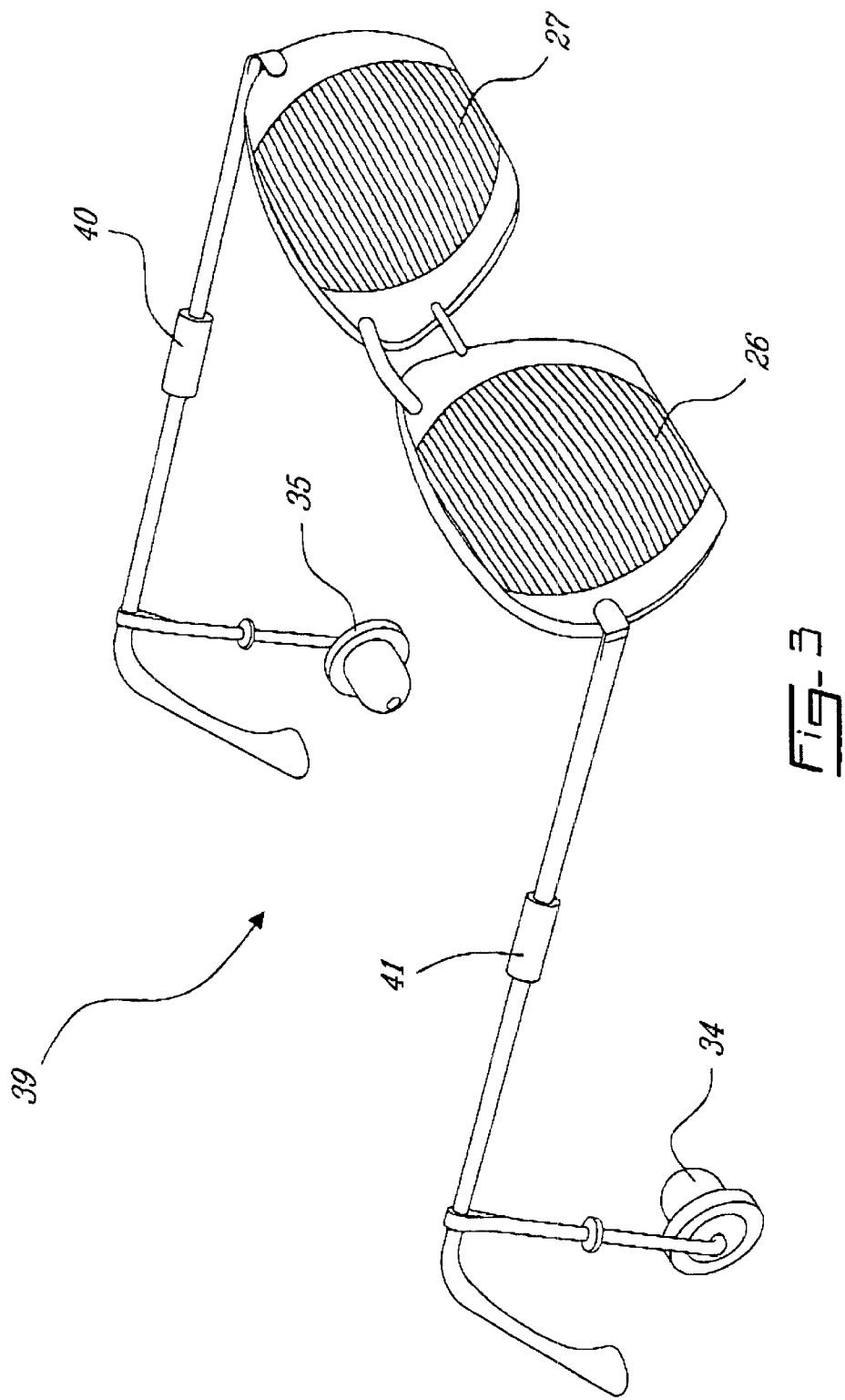
FIG. 3 is a perspective view of glasses that incorporate the present invention in one possible embodiment of the present invention.

FIG. 3 depicts how the glasses 39 of the preferred embodiment of the present invention might appear. The most notable features would be the left 27 and right 26 transducers. Left 35 and right 34 audio output devices, in the preferred embodiment would be typical small earphones, which the user would insert into each ear. The remainder of the electronics that makes up the invention would be typical miniaturized built into temple supports 40 and 41. Actual electronic parts have not been identified for the functional parts enumerated with respect to FIGS. 1, 2 and 3 since those skilled in the art, once they understand the concepts enumerated herein will be able to obtain the necessary parts to fabricate the present invention without any difficulty.

Figure 4:
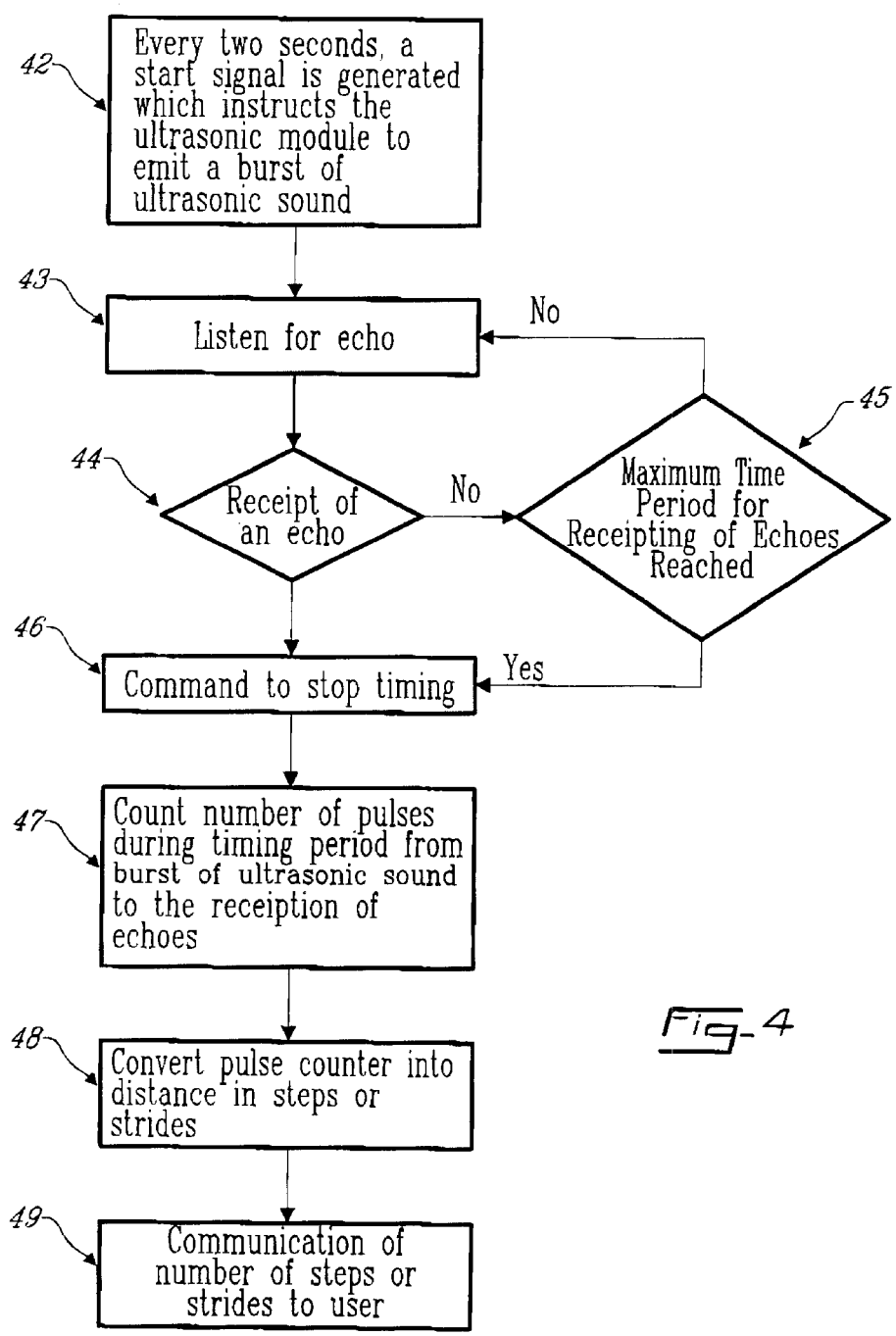
FIG. 4 provides a flow chart that depicts the functional steps of the present invention.

Operation of the Invention:

FIG. 4 provides a flow diagram that depicts the overall operation of the system of the present invention. In the preferred embodiment every two seconds, the Logic Control module generates a START signal that will allow the Ultrasonic module to emit a burst of ultrasonic waves 42. The transducers 30 and 31 then listen for returning echoes 43. In the meantime, this START signal is also sent to the Distance and Direction Discrimination module 24 to start counting distance-base pulses 42.

Upon detecting an echo, the Ultrasonic module sends out an ECHO received signal 44 which is then passed on to the Logic Control module 23 to generate a STOP LEFT or STOP RIGHT signal. These STOP signals are passed to Distance and Direction Discrimination module 24 to stop counting pulses 46. The Distance and Direction Discrimination module 24 then counts the number of pulses generated by the timing mechanism between the START signal and the signal to stop timing 47. The Information Presentation module 28 then reads out the number of pulses counted between the START and STOP signals and determines the distance in strides 48. This information is then transmitted to the user in the form a human voice 49. When there is no echo being detected within the maximum normalized time period 45, the Logic Control module will generate a STOP signal to stop timing 47.

Figure 5:
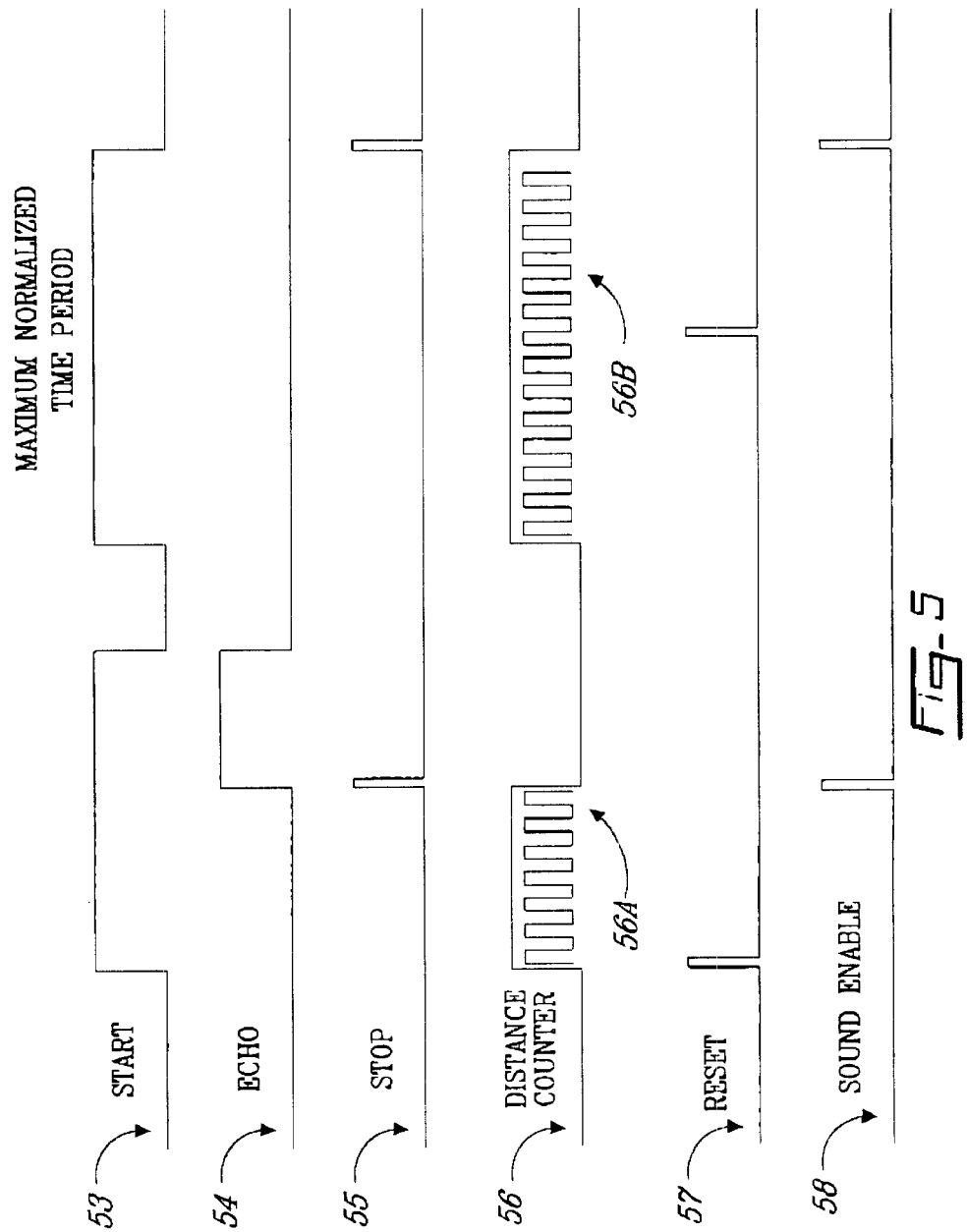
FIG. 5 is the timing diagram of the major signal generated during operation of the present invention.

FIG. 5 provides a timing diagram with the major signals generated during normal operation of the present invention. The system first generates a START signal 53 which initiated generation of ultrasonic pulses by the transducers and the commencing of the timing or distance count 56. Commencing of the distance count involves commencing of the timing pulses 56A. A periodic reset signal 57, generally one every two seconds, commences the start or START signal 53. Upon receipt of an echo, an ECHO signal is received which halts the timing sequence 56 and generates a sound enable signal. When there is no echo received within the maximum normalized time period, a STOP signal is generated to halt the timing sequence 56B.

Presentation of Distance as Strides:

The ultrasonic travel aid does not directly measure the distance to an object. Instead, it measures the time taken for the ultrasonic waves to make a round trip from its transducer 30 and 31 to an object and back again. Therefore, knowing the speed of ultrasound and the time taken to travel for a round trip, the distance between the user and the object can be calculated using the formula: $D=(S \times t)/2$, where t is the time elapsed between the START and STOP signals.

We know that the speed of ultrasound is approximately 343 m/s, which implies that is takes ultrasonic waves approximately 6 milliseconds to travel one meter for a round trip. If we can generate pulses at 6 milliseconds per cycle, then, by counting the number of pulses between START and STOP signals, we would know the distance in meters immediately.

As mentioned above, it is difficult for the visually impaired to comprehend distance in meters. Hence a little "artificial intelligence" is added. The distance is given out in the form of steps. For example, it takes ultrasonic waves approximately 2 milliseconds to travel 0.343 meters in round trip, which is approximately the length one step of an adult. Consequently, if we turn the distance-base generator 60 to generate pulses at two milliseconds per cycle, we would know the distance in steps instead of meters. This time base can be easily calibrated to suit the user with different length of step.

One of the unique features of the present invention is the presentation of distance by the human voice. State of the art static recorder chip is used to convert the number of steps into human voice. The information presentation module 28 can be a standard static recorder chip that allows the recording of messages onto the chip for played back at any time. Around thirty messages were to be recorded, and a systematic procedure was derived to allow messages to be played back with as little delay as possible.

Two methods are possible. The first being message cueing to a recorded message. This proved to be difficult for the delay was too long in order to skip messages. The second method involved accessing a recorded message by a specific address. The standard static recorder that can be used contains six hundred addresses with a total duration of sixty seconds. This means that one second of recording time is equivalent to ten address counts. If each message lasted 1.6 seconds, it could be stored in the space of sixteen addresses. Since sixteen is an "even" binary multiple, we can ignore all the counts less than sixteen by strapping the corresponding bits to ground and programming the remaining bits. This simplifies the design tremendously, because the address of messages stored in the chip are directly related to number of steps, as shown in the table at FIG. 6. In this way, the number of steps measured by Distance and Direction Discrimination module 24 can directly access the voice recording of "n steps".

Calibration:

The present invention includes a means to calibrate the apparatus to the individual stride or step characteristics of the user. To calibrate the present invention, the user simply activates the calibration module 33 of FIG. 1 with control 79. The user takes a predefined number of strides, for example, four strides, away from a wall. Then, he or she will turn and face the wall. The user then places the apparatus in the calibration mode, which will measure the distance between the user and the wall in term of number of clock cycles. When the user pushes the confirmation button, the unit then determines the number of pulses equivalent to the average stride of the user calibrating the device. This information is stored on the system as a reference to generate the distance-base pulse that will be used to measure the distance in strides or steps.

An Additional View of The Invention:

As noted above the present invention as depicted in FIG. 1 is an obstacle ranging system for visually impaired pedestrians comprising a Dual Sensing module 25, a Distance and Direction Discrimination module 24, a Logical Control module 23, an Information Presentation Interface 22, a Distance-Base Generator module (which in the preferred embodiment forms part of the Distance and Direction Discrimination module 24 or Logical Control module 23), and a calibration module 33.

The Dual Sensing module 25 comprises two ultrasonic drivers 26 and 27. The ultrasonic driver transmits a burst of ultrasonic signals when it receives the START command and listens for echoes. When the ultrasonic driver receives echoes from the obstacle, it sends out an ECHO signal. The two channels of the Dual Sensing module 25 operate independently of each other and the system of the present invention is able to process the information from each channel separately and determine if two different objects are on the left and right side of the path of the user are at different distances from the user and which is closer to the user of the invention.

The Distance-Base Generator module 60 in the preferred embodiment is incorporated in the logical control module or the distance and direction discrimination module. However, it could be separately configured without too much difficulty. The purpose of the Distance-Base Generator module 60 is to generate step-time base pulse 56A and 56B of FIG. 5. It comprises a crystal clock generator and a counter. When it receives a START signal from the Control Logic module 23, it begins to generate Distance-Base pulse. It uses the step length (number of crystal clock cycle) stored in the calibration module as a reference. The reference has been set during the calibration mode. The reference is a measure of the average stride of the user. When the crystal clock cycle reaches this number, it generates a distance pulse. When it receives the STOP LEFT and STOP RIGHT signals from the Control Logic module 23 when the Control Logic module 23 receives and echo signal from either ultrasonic drivers 26 and 27, it resets the distance generation counter. It should be noted that this process occurs separately for each ultrasonic driver allowing the system to discriminate between information received from each channel of the dual sensing module 25.

The Distance and Direction Discrimination module 24 is the core of the invention. This module includes a Distance-Base Generator 60, a Dual Distance Counter 61 and 62, a Distance Extractor 63 and a Directional Information Generator 64, etc. sub-components. When the Control Logic module sends out the START signal to the ultrasonic module, the Distance-Base Generator 60 starts to generate pulses. In the mean time, the Dual Distance Counter 61 and 62 also start to count the number of distance-base pulse. When the module receives the STOP LEFT or STOP RIGHT signals, the corresponding distance counter 61 or 62 stops counting. The counted number of distance-base pulses is proportional to the distance between the obstacle and the sensor.

The Distance Extractor 63 determines which obstacles detected by the dual ultrasonic driver is closer to the user. To do this, it compares the Dual Distance Counter 61 and 62 outputs, taking the smaller one representing the object closer to the user. In the preferred embodiment of the present invention, outputs from the Dual Distance Counter 61 and 62 will be normalized by a preset value that represents the largest distance the sensor can measure. As noted the preferred embodiment of the present invention has a maximum range of 20 to 30 meters; however, as a practical matter the actual range in the preferred embodiment is normalized to a maximum of 10 meters, anything beyond this distance being indicated by the system as beyond range. The information presentation module uses the output of the normalized counter number in presenting the information on distance to the user of the system.

The control logic means control of the operation of the talking glasses. The flow chart of FIG. 4 and the timing diagram of FIG. 5 indicate the procedure it uses for control and operation of the system. It first sends out a START signal that will start the Dual Ultrasonic Driver module 25, start the Dual Distance Counter 61 and 62, and reset the static recorder and an internal step down counter. When it receives an ECHO signal from the ultrasonic driver module, it will stop the corresponding distance counter. When it receives both ECHO signals from the dual ultrasonic driver, it sends out a signal to the Distance and Direction Discrimination module 24 to start the process of determining the distance to the object or objects which side are they on etc. When the module stops processing, it sends out a signal to the Information Presentation module 22 to present the information to the user based on the information provided to the information presentation module by the Distance and Discrimination module.

The information presentation module can be best understood by FIG. 1 and FIG. 3. It has two parts, an audio generation part and what amounts to a 3-D surrounding sound generation part or more correctly left and right sound channels. The audio generation part contains pre-recorded information, such as "one step", "two steps", and "three steps". . . This information is stored using a static recording technique and it can be accessed by index by standard procedures well known in the industry. Thus, the number of steps can be used directly as audio information index. It should be noticed that when the distance is too far, for example, excess the possible distance that ultrasonic driver can measure or is beyond the normalized range, the audio output is "too far". However, when the distance is too close, for example, less than one step, the audio output will be "too close". The second part is to use of the left channel right channel audio out put to present the direction information. When an obstacle on the left hand side is closer than an obstacle on the right hand side, the left hand side audio output will be more pronounced or louder than the right hand side audio output. The normalized distances for both left hand side control the depth of field or range and right hand side as described above.

The calibration module 33 as depicted in FIG. 1 has a control 79 in the preferred embodiment a push button. The calibration module 33 also has a distance input and means to store the step length pertaining the user. The clock generator of the system generates the time base input. When the device is first powered, a predefined number of time bases corresponding to the length of one step are loaded into the step length memory. When the user pushes the calibration button the system of the invention is in the calibration mode. It measures a predefined number of steps, for example, four steps. The number of time bases corresponding to the length of one step will be calculated and stored in the step length memory which will be used as the reference to convert the distance measurement into number of steps.

While the invention has been particularly shown and described with reference to a preferred embodiment thereof, it will be understood by those skilled in the art that various changes in form and detail may be made to it without departing from the spirit and scope of the invention.

What is claimed is:

1. A method for assisting a visually impaired person in determining the distance to objects in that person's path, said method comprising:

projecting from a location adjacent to a person at least one ultrasonic transmission in the direction the person is moving;

listening for an echo of the at least one ultrasonic transmission;

using information obtained from the echo of the at least one ultrasonic transmission to determine the distance to the object which produced the echo in a measure equivalent to the stride of the visually impaired person; and communicating that distance determination to the person using the method.

2. The method of claim 1 wherein the measure equivalent to the stride of the visually impaired person is equivalent to the elapsed time of travel of the at least one ultrasonic transmission for the same distance as the time to take the stride.

3. The method of claim 1 wherein in the step of communicating the distance in strides is communicated by an audio signal.

4. The method of claim 3 wherein the step of providing an audio signal comprises providing a human voice which states the total number of strides to the object which created the echo.

5. The method of claim 4 wherein the step of providing the human voice stating the number of strides to the object is providing a data bank of prerecorded human voice transmissions with a range of strides for communication to the person using the method.

6. The method of claim 1 wherein the step of projecting at least one ultrasonic transmission comprises the step of projecting at least two parallel but independent ultrasonic transmissions and the step of listening for the echo of the at least one ultrasonic transmission further includes listening for the echo of each ultrasonic transmission of the at least two parallel but independent ultrasonic transmissions independently.

7. The method of claim 6 wherein the steps of projecting and listening for at least two ultrasonic transmissions comprises mounting a first ultrasonic transducer on a right side of a pair of glasses worn by the person for projecting a first ultrasonic transmission and listening for an echo thereof and mounting a second ultrasonic transducer on the left side of the pair of glasses for projecting a second ultrasonic transmission and listening for an echo thereof.

8. The method of claim 6 comprising the further steps of determining if two or more different objects are on either side of the direction of the person using the method and determining if one is closer to the user and communicating this information to the user.

9. The method of claim 1 wherein the step of projecting at least one ultrasonic transmission comprises producing it with an ultrasonic transducer and the step of listening for the echo of the ultrasonic transmission comprises detecting it with the ultrasonic transducer.

10. An apparatus for assisting a visually impaired person in determining the distance to objects in that person's path, said apparatus composes:

an ultra sonic generation module for generating and receiving pulses of ultrasonic sound;

a logical and control module in communication with said ultrasonic generation module, whereby said logic control and control module periodically sends a start signal to said ultrasonic generation module, which thereby causes said ultrasonic generation module to generate a pulse of ultrasonic sound and upon receipt by said ultrasonic generation module of an echo created when of said pulse of ultrasonic sound strikes an object said logic and timing module receives from said ultrasonic generation module a stop signal;

a distance and direction discrimination module which concurrently receives said start signal when generated by said logic and control module and said stop signal when received by said logic and control module and wherein said distance and direction discrimination module can determine from a time differential between said start and stop signal a distance to an object which created said echo received and then generate a signal determinative of distance;

an information presentation module in communication with said distance and direction module which upon receipt of said signal determinative of distance sends an audio signal to said visually impaired person of a distance to said object; and wherein said audio signal is in a form of a personalized signal for said visually impaired individual for ease of comprehension by said visually impaired person, and said personalized signal indicates said distance in terms of a stride of the visually impaired person.

11. The apparatus of claim 10 wherein said ultrasonic generation module further comprises a left ultrasonic driver operatively connected to a left transducer and a right ultrasonic driver operatively connected to a right transducer and wherein said left and right ultrasonic drivers, through there respective transducers, generate ultrasonic pulses on receipt of a start signal and upon receipt of an echo by said right ultrasonic driver it sends a right stop signal and upon receipt of an echo by said left ultrasonic driver it generates a left stop signal and wherein said distance and direction discrimination module on receipt of said left or right stop signal generates a signal determinative of distance and location with respect to said visually impaired person.

12. The apparatus of claim 11 wherein said information presentation module further comprises: left and right channel audio drivers for signaling to said visually impaired individual the location of the object which generated the echo based on said left stop or right stop signal.

13. The apparatus of claim 12 wherein in said apparatus is miniaturized for positioning on a visually impaired person in an unobtrusive manner such that said transducers of said left and right ultrasonic drivers are positioned so that said left transducer provides coverage of an area to the left and front of said visually impaired individual and said right transducer provides coverage for a right and front side of said visually impaired person.

14. The apparatus of claim 13 wherein said left audio channel driver connects to a first audio output device positioned at the end of a left ear of the visually impaired person and said right channel audio driver is connects to a second audio device positioned at the end of a right ear of the visually impaired person.

15. The apparatus of claim 14 wherein said apparatus is fabricated within a specially designed set of glasses.

16. The apparatus of claim 10 further comprising a calibration module which allows the visually impaired individual to calibrate said apparatus to the normal stride of the visually impaired individual.

17. The apparatus of claim 10 wherein said distance and direction discrimination module comprises:
  a. a distance base generator which upon receipt of a start signal commences a timing cycle and upon receipt of a stop signal halts said timing cycle; and
  b. a distance extractor which based on said time differential, as calculated by said timing cycle between said start and stop signal, determines said distance to said object.

18. The apparatus of claim 11 wherein said distance and direction discrimination module comprises:
  a. a distance base generator operatively connected to a left distance counter and a right distance counter and wherein on receipt of a start signal said distance based generator signals both said left and right distance counters to commence timing cycles and on receipt of a left stop signal, signals said left distance counters to halt its said timing cycle and/or upon receipt of a right stop signal, signals said right distance counter to halt its timing cycle;
  b. a distance extractor operatively connected to said left and right distance counter which upon receipt of information on a halted timing cycle from said left and right distance counter determines a distance to said object which created said echo which initiated said left or right stop signal; and
  c. a directional information generator operatively connected to said left and right distance counters which based on a timing differential between said timing cycles generated by said left and right distance counters determines which of two objects which created said echoes which in turn generated a left and/or right stop signal is closer to said visually impaired individual.

* * * * *